(12) United States Patent
Pengg et al.

(10) Patent No.: US 8,234,852 B2
(45) Date of Patent: Aug. 7, 2012

(54) TRACK LINK FOR ANTI-SKID CHAIN

(75) Inventors: Agyd Pengg, Klagenfurt (AT); Karl Schmid, Bruckl (AT)

(73) Assignee: Pewag Schneeketten GmbH & Co KG, Bruckl (AT)

( * ) Notice: Subject to any disclaimer, the term of this patent is extended or adjusted under 35 U.S.C. 154(b) by 145 days.

(21) Appl. No.: 12/791,262

(22) Filed: Jun. 1, 2010

(65) Prior Publication Data

US 2010/0307127 A1    Dec. 9, 2010

(30) Foreign Application Priority Data

Jun. 3, 2009 (AT) .................................. A 856/2009

(51) Int. Cl.
*B60C 27/08* (2006.01)
*F16G 13/02* (2006.01)

(52) U.S. Cl. .................... 59/78; 59/84; 59/93; 152/239; 152/243; 474/155

(58) Field of Classification Search ................. 59/78, 83, 59/84, 90, 93; 152/231, 239, 241, 243; 474/155, 474/206

See application file for complete search history.

(56) References Cited

U.S. PATENT DOCUMENTS

| | | | | |
|---|---|---|---|---|
| 1,219,088 A * | 3/1917 | Davis | ............. | 152/239 |
| 1,229,244 A * | 6/1917 | Eckert | ............. | 152/239 |
| 2,050,278 A | 8/1936 | Cull | | |
| 2,093,547 A * | 9/1937 | Campbell, Jr. | ............. | 152/243 |
| 2,650,470 A * | 9/1953 | Sennholtz | ............. | 59/90 |
| 3,453,823 A * | 7/1969 | Mundt | ............. | 59/90 |
| 3,796,246 A * | 3/1974 | Walenta | ............. | 152/231 |
| 3,910,333 A * | 10/1975 | Muller | ............. | 152/243 |
| 4,110,971 A * | 9/1978 | Bruce | ............. | 59/84 |
| 4,165,775 A * | 8/1979 | Rieger | ............. | 152/243 |
| 4,349,060 A * | 9/1982 | Espedalen | ............. | 152/172 |
| 4,361,178 A * | 11/1982 | Gower | ............. | 152/172 |
| 5,307,852 A | 5/1994 | Preusker | | |
| 5,423,365 A | 6/1995 | Labonville | | |
| 6,871,486 B2 * | 3/2005 | Moehnke et al. | ............. | 59/78 |
| 7,107,754 B2 * | 9/2006 | Sinz et al. | ............. | 59/78 |

FOREIGN PATENT DOCUMENTS

| | | |
|---|---|---|
| AT | 376177 | 10/1984 |
| AT | 007811 | 9/2005 |
| DE | 2166881 | 7/1976 |
| DE | 9215693 | 2/1993 |
| DE | 4333262 | 11/1994 |
| GB | 512837 | 9/1939 |

OTHER PUBLICATIONS

Translation of relevant parts of the first Communication of the Austrian Patent Office in the priority applicaiton, Jan. 14, 2010.
Translation of relevant parts of the second Communication of the Austrian Patent Office in the priority application, May 6, 2010.

* cited by examiner

*Primary Examiner* — David B Jones

(74) *Attorney, Agent, or Firm* — Design IP

(57) ABSTRACT

The present invention pertains to a chain link for an anti-skid chain, wherein the chain link is designed as a straight chain link with an essentially oval shape with an upper and a lower side wall. The outer cross-sectional area of the chain link has a half-round design and the inner cross-sectional area has an angular design. At the same time, the present invention pertains to an anti-skid chain with a chain mesh, which has chain links according to the present invention.

9 Claims, 2 Drawing Sheets

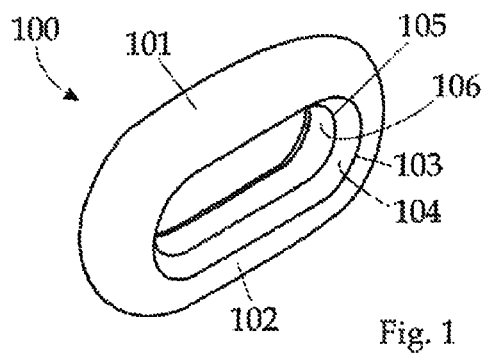
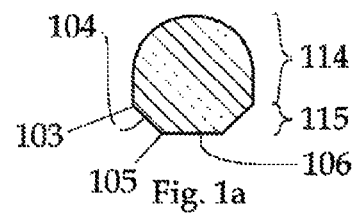
Fig. 1
Fig. 1a
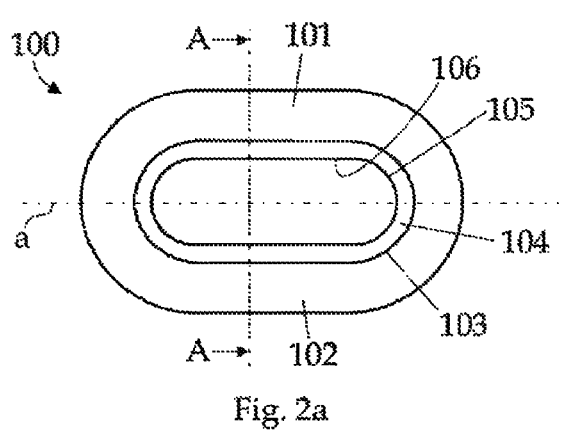
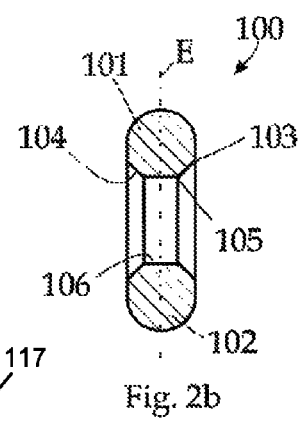
Fig. 2a
Fig. 2b
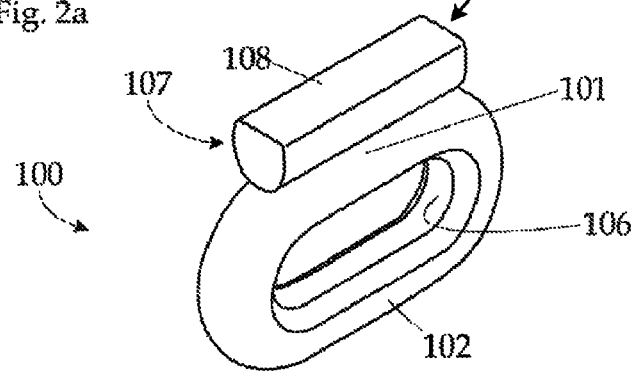
Fig. 3
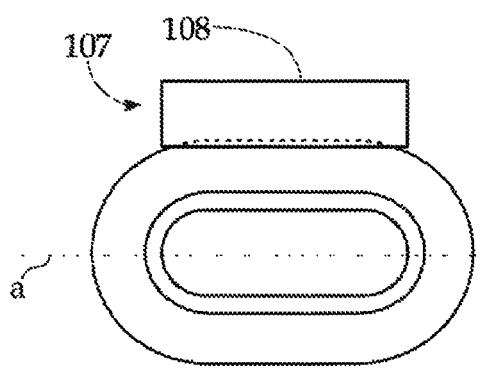
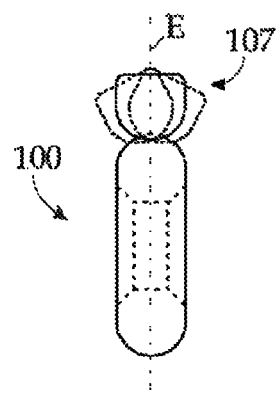
Fig. 4a
Fig. 4b

TRACK LINK FOR ANTI-SKID CHAIN

CROSS REFERENCE TO RELATED APPLICATION(S)

This application claims priority from Austrian Patent Application Serial No. A856/2009, filed Jun. 3, 2009, which is incorporated by reference as if fully set forth.

FIELD OF INVENTION

The present invention pertains to a chain link for an anti-skid chain, wherein the chain link is designed as a straight chain link with an essentially oval shape with an upper and a lower side wall.

Furthermore, the present invention pertains to an anti-skid chain for vehicle tires with a chain mesh, which contains chain element configurations which consist alternately of oblong, vertical chain links and horizontal chain links meshing with recesses of same, wherein vertical and horizontal are defined in relation to a running surface of the vehicle tire.

BACKGROUND

In the area of anti-skid chains, which usually consist of chain links arranged in the form of a chain mesh, different profiles are used in the chain links. The following embodiments refer primarily to conventional straight chain links with an oval shape. Straight chain links are defined here as those whose side walls lie with a longitudinal central axis in one plane.

One profile that is frequently represented on the market is the round link chain, in which the chain links have a round cross section. Furthermore, square chains, whose chain links have essentially a rectangular or square profile, are found in the state of the art.

The most frequently used profile in chains is the special square chain, whose chain links have a square profile on the outside and are designed with a round profile on the inside. "On the outside" is defined here as the outwardly directed area of the chain links, while "on the inside" is designated as the inner area, i.e., almost the interior of the oval of the chain link (or the eye of the chain link).

The chain types mentioned are additionally designed with parts subject to wear such as stubs, spikes or straps for increasing the lifetime and anti-skid effectiveness. Consequently, on the one hand, the lifetime is increased, because the load of the chain links is partly rolled over onto the parts subject to wear. On the other hand, thanks to the thus enhanced anti-skid chain, the adhesiveness or grip to the roadway is increased, slipping to the subsoil is markedly reduced and returns almost to zero.

However, a slipping may occur between the tires and the inner side of the chain mesh (i.e., the side of the chain mesh facing towards the tire, which usually does not have any parts subject to wear). In the extreme case, such forces may occur that the chain links develop a shear action on the profile of the tires and the tires are damaged, which is a problem especially in the pure square chains.

Such a shear action is, of course, lowest in chains with round links. However, round links are also very movable in relation to one another, which leads to skewing of the chain links during driving and in case of higher loads, as a result of which the gripping action to the roadway is reduced—for example, because the parts subject to wear are no longer in optimal contact with the roadway.

In case of special square chains which have an angular profile on the outside and a round profile on the inside, there is a better gripping action with the roadway, since the edges of the square profile are interlocked with the tire profile on the outer side of the chain links and therefore contribute to an immediate transmission of forces from the tire to the subsoil. However, chains with such a special square profile have a certain flexibility due to the round profile design on the inner sides, such that the chain links tend to tilt and then, under a load, the chain slips over the tire surface. Then, this slipping may in turn lead to damage on the tire profile, but at any rate to additional wear. Moreover, the traction during driving is poor due to this skewing of the chain links as in the case of round link chains.

Square chains, which have an angular profile on the inside and outside, have a very low tendency to slip, since the chain links are not very movable in relation to one another as well as in relation to the tire profile. Such a chain proves to be a very stiff structure, whereby high forces occur between the chain links under a load, on the one hand, and, on the other hand, it threatens damage to the profile of the tire.

SUMMARY

The present invention provides a chain link with a profile, which eliminates the above-mentioned drawbacks of the state of the art and at the same time does not lead to tire damage when used in an anti-skid chain on a vehicle tire.

This is accomplished according to the present invention with a chain link of the above-mentioned type by an outer cross-sectional area of the cross section of the chain link having a half-round design and an inner cross-sectional area having an angular design.

Thanks to the present invention, on the one hand, tire surfaces are protected, because the side facing towards them has a half-round design. On the other hand, the chain links can, due to the angular design of their interior, be optimally combined with other chain links into anti-skid chains, which are especially torsion-proof and under a load remain in good contact with the roadway and thus increase the grip between chain and roadway.

In a variant of the present invention, the inner cross-sectional area has a flat side extending on both sides of a central plane, which is oriented essentially perpendicular to the central plane of the chain link and which is defined by an edge on both sides. The inner cross-sectional area of the chain link (i.e., the angular profile area of the chain link that is oriented towards the interior of the chain link) looks in detail such that the profile passes from the half-round outer cross-sectional area over edges into a flat area or a flat side, which is designated as an angular profile in the present embodiments. Edges designate straight lines here, which run along the strand of chain links and are oriented in the area of the side walls parallel to a longitudinal central axis of the chain link. These edges are not exclusively sharp, rectangular edges, but rather transitions with larger or smaller radii are thus also designated.

The flat area or flat side is arranged perpendicular to the central plane of the chain link, wherein it is oriented along the upper and lower side walls of the chain link essentially parallel to a longitudinal central axis.

In another variant of the present invention, the inner cross-sectional area of the chain link joins, on both sides of a central plane, an area which is chamfered with regard to the central plane on a first edge at an area oriented parallel to the central plane of the chain link, wherein the chamfered area forms an angle smaller than 90° with the central plane, and joins a flat side at the chamfered area on a second edge, which is oriented essentially perpendicular to the central plane of the chain link. This means that the half-round cross-sectional area passes on a first edge into a chamfered area, which forms an acute angle with the central plane, and this chamfered area is connected to a second edge on a flat side, which is oriented essentially perpendicular to the central plane of the chain link. Such a chain shape can be produced very easily; furthermore, due to the said transitions, less wear occurs between outer and inner cross-sectional area under a load, since there are no rectangular edges that might be sheared off in case of opposing movement of chain links.

At least one part subject to wear is advantageously arranged on the upper side wall of the chain link. Thanks to the part subject to wear, the grip between chain link and roadway is increased, and at the same time, the lifetime of the chain links is increased, since predominantly a demand is put on the parts subject to wear and not the chain links due to difficult road conditions when the chain links are loaded. Thanks to the profile according to the present invention, the stud of the chain link does not lie at an angle due to the stiffness of the inner rounding of the links and the mounted parts subject to wear bring optimal traction in driving.

In a variant of the present invention, the part subject to wear has a half-round profile on its side facing towards the chain link and a flat profile on its side facing away from the chain link, which is oriented essentially perpendicular to the central plane of the chain link. Thus, the profile of the part subject to wear is certainly a reflection of the cross section of the chain link. Consequently, an especially good grip between chain link and roadway can be achieved by means of the part subject to wear when used in an anti-skid chain (or generally in a vehicle chain).

In an advantageous variant, the at least one part subject to wear is embodied in the form of a pin. A pin may be designed, e.g., with a round, angular or polygon-shaped cross section. The part subject to wear may also have other shapes, for example, straps, nubs, spikes with different profiles or the like. Basically, different types of parts subject to wear may also be combined. Basically, pin-shaped parts subject to wear are simple to manufacture and can be easily mounted on the chain link, for example, by means of welded joints.

The part subject to wear is advantageously arranged in a manner inclined towards a central plane of the chain link. Due to an inclined arrangement of the part subject to wear or the pin, a good traction of the chain links is also made possible with the lowest, load-induced torsion of the anti-skid chain, whose part is the chain link according to the present invention.

The above-mentioned object is further accomplished with an anti-skid chain of the type mentioned in the introduction according to the present invention by the anti-skid chain having vertical chain links according to the above-mentioned present invention. The advantages of this anti-skid chain were discussed based on the chain link according to the present invention.

Advantageously, at least one of the vertical chain links of the anti-skid chain has a part subject to wear.

In an advantageous variant of the present invention, above a horizontal chain link arranged between two vertical chain links is arranged another, transverse, chain link, whose central plane is oriented perpendicular to the central plane of the vertical chain links. Consequently, an additional element is provided in the chain, which further improves the traction characteristic of the chain.

It is especially advantageous if the transverse chain link has at least one part subject to wear. As a result, the grip of the chain is improved.

BRIEF DESCRIPTION OF THE DRAWINGS

The present invention is explained in detail below based on a nonlimiting exemplary embodiment, which is shown in the drawings. In the drawings:

FIG. 1 schematically shows a perspective view of a chain link according to the present invention, FIG. 1a schematically shows the cross section of the chain link according to the present invention, FIG. 2a schematically shows a lateral view of the chain link of FIG. 1 in the direction of its central plane, FIG. 2b schematically shows a sectional view of the chain link of FIG. 1 along the line A-A in FIG. 2a, FIG. 3 schematically shows a perspective view of a variant of the chain link according to the present invention with a part subject to wear, FIG. 4a schematically shows a front view of the chain link of FIG. 3, FIG. 4b schematically shows a view of the chain link of FIG. 3 in the direction along its longitudinal central axis, FIG. 5 schematically shows a perspective view of a part of the anti-skid chain, consisting of chain links according to the present invention with part subject to wear, FIG. 6a schematically shows the chain part of FIG. 5 in a view in the direction of the central plane of the vertical chain links, and FIG. 6b schematically shows a top view of a chain according to FIG. 5, in the direction of the central plane of the horizontal chain link shown.

DETAILED DESCRIPTION OF THE PREFERRED EMBODIMENTS

Figure 5:
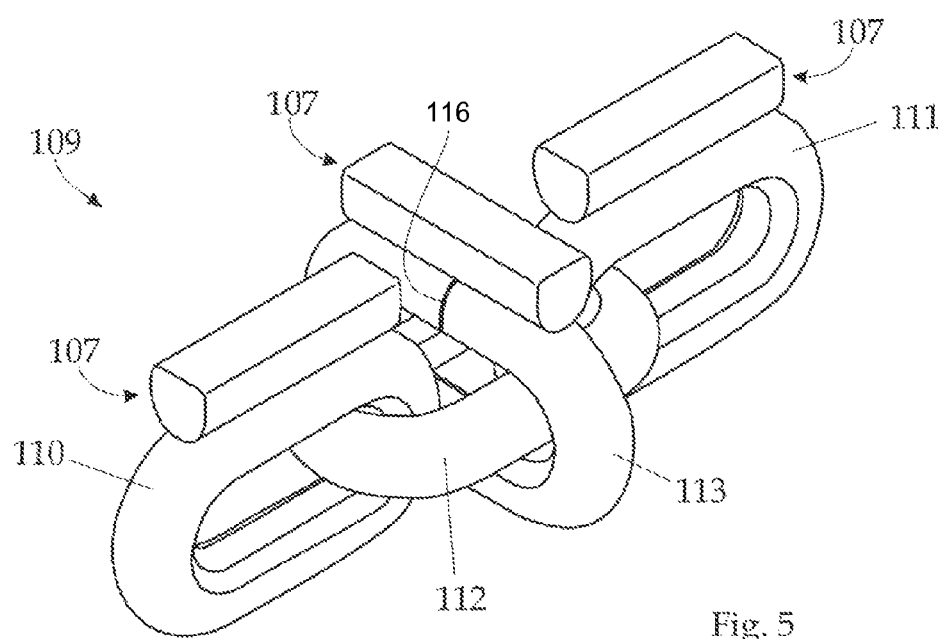

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale.

FIG. 1 shows a perspective view of a chain link 100 according to the present invention. Said chain link is a straight chain link 100 in oval shape. The chain link 100 has an upper side wall 101 and a lower side wall 102, whereby upper and lower are defined here according to the view in FIG. 1. A longitudinal central axis a runs parallel to the side walls 101, 102 through the center of curvature of the chain link, considering the oval shape of the chain link 100.

A straight chain link 100 is defined here as one, in which the side walls 101, 102 and longitudinal central axis a lie in a common plane. This plane is designated as central plane E (see description of FIG. 2a and FIG. 2b).

The special feature of the chain link according to the present invention 100 lies in the fact that it has a special profile. It can be seen in FIG. 1 that the outer cross-sectional area of the chain link 100 is rounded, i.e., has a half-round profile. On the other hand, on the inner side of the chain link 100, the inner cross-sectional area has an angular design. Thus, the cross section passes on a first edge 103 into an area 104 which is chamfered compared to the outer side, which passes on a second edge 105 into a flat side 106, which is oriented essentially perpendicular to the central plane E and parallel to the longitudinal central axis a in the area of the side walls 101, 102. The flat side 106 extends on both sides of the central plane E. The flat side 106—which extends over the entire inner side of the chain link 100, even in the transition areas between the side walls 101, 102—is generally oriented perpendicular to the central plane E. The chamfered area 104 forms an acute angle or an angle smaller than 90° with the central plane E of the chain link 100.

The entire extension of the flat side 106 in a direction perpendicular to the central plane E (but on both sides of the central plane E, since the flat side 106 already extends on both sides of the central plane E) is at least half as great as the diameter of the profile cross section.

FIG. 1a shows a detail view of the cross section of the chain link according to the present invention, with the outer cross-sectional area 114, which is connected to the inner cross-sectional area 115 via a first edge 103, which has a chamfered area 104, which in turn is connected to the flat side 106 via a second edge 105. Thus, with the chamfered area 104, FIG. 1a and the other figures show a special embodiment of the present invention—basically the outer cross-sectional area 114 can pass into the flat side 106 via a simple edge 103, 105, which runs along the entire strand of chain links. A chamfered part 104 may optionally be provided to vary the transition between outer 114 and inner 115 cross-sectional area.

FIG. 2a shows a view of the chain link 100 from FIG. 1 in the direction of its central plane E, which lies in the plane of the page in the present figure. Indeed, the design of the profile cannot be seen here; however, FIG. 2a shows the first 103 and the second edge 105 as well as the fact that the flat side 106 is actually oriented perpendicular to the central plane E in the area of the side walls 101, 102.

FIG. 2b shows a section of the chain link 100 according to the present invention along a line A-A in FIG. 2a, whereby the view is along its longitudinal central axis a. Here, the chamfered area 104 between the first 103 and second edge 105 as well as the flat side 106 perpendicular to the central plane E can be seen.

FIG. 3 shows a chain link 100 according to the present invention, on which upper side wall 101 is arranged a part subject to wear 107. The part subject to wear 107 is used to increase the traction between chain link 100, or anti-skid chain, and roadway; as the name already states, it is also used to protect the chain link 100 as it absorbs the forces occurring during use and reduces the wear of the chain links.

In the present exemplary embodiment, the part subject to wear 107 has a profile that is reflective of the shape of the chain link 100. On the side facing towards the upper side wall 101, the part subject to wear 107 has a half-round profile. The side of the part subject to wear 107 pointing away from the chain link 101 has a flat design (or perpendicular to the central plane E of the chain link 100 and essentially parallel to the longitudinal central axis a of the chain link 100), wherein the pointing-away area 108 on the side pointing away from the chain link 100 is oriented essentially parallel to the flat side 106 in the interior of the chain link 100 in the area of the side walls 101, 102.

Of course, the part subject to wear 107 may also have a different shape, for example, it may have a polygon-shaped, round or even oval design. Furthermore, it is possible, instead of the rectangular parts subject to wear shown, to provide a plurality of individual pins 117. The part subject to wear 107 may, furthermore, be arranged in such a way that the said pointing-away area 108 is not oriented perpendicular to the central plane E, but rather forms a different angle smaller than 90°. This also applies to other forms of parts subject to wear, such as pins 117, straps and the like.

FIGS. 4a and 4b show the chain link 100 from FIG. 3 in sectional views in the direction of the central plane E (FIG. 4a) and perpendicular to (FIG. 4b) the central plane E, as a front view in the direction of the longitudinal central axis a. By contrast to FIG. 2b, FIG. 4b does not show a sectional view; the chain link limitations, which are arranged within the chain link 100 and actually therefore cannot be seen, are shown in broken line for better understanding.

The part subject to wear 107 in FIG. 4b is arranged in such a way that its axis of symmetry lies in the central plane E of the chain link 100. However, it is also possible that the part subject to wear 107 (or its axis of symmetry) is inclined towards the central plane E of the chain link 100. Such a variant is shown in FIG. 4b by parts subject to wear 107 shown in broken line. By means of such a solution, the gripping characteristic of the chain link 100 can be expanded—small torsions of the chain link in case of excess loading of the chain would nevertheless not produce any changes in the gripping characteristic of the chain, in which the chain link is arranged, by means of a more reliable meshing of the parts subject to wear 107.

Figure 6A:
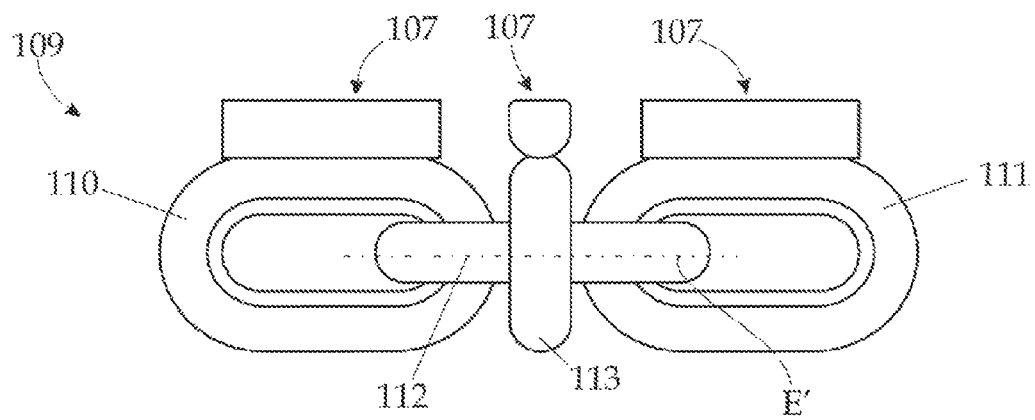
Figure 6B:
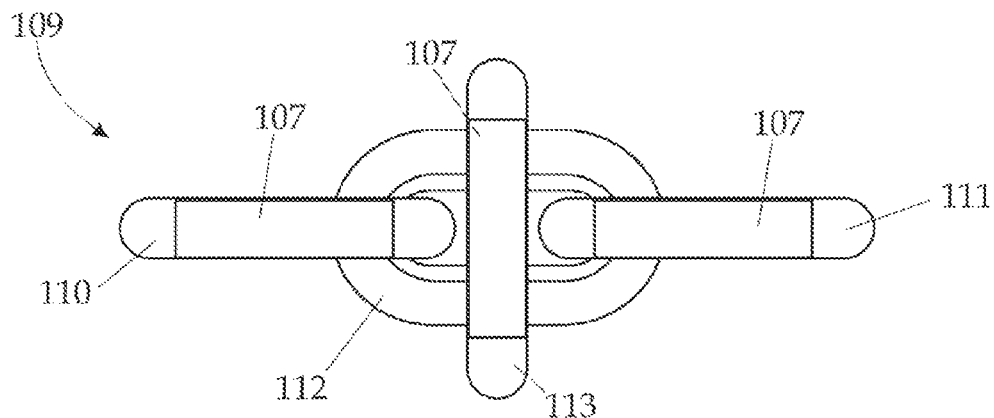

FIGS. 5, 6a and 6b show a plurality of chain links according to the present invention in the embodiment of FIG. 3 (and also FIGS. 4a and 4b) in the compound arrangement of an anti-skid chain 109.

A distinction is essentially made here between vertical and horizontal chain links. This designation is defined in connection with a chain arranged on a vehicle tire—here some of the chains links are parallel to the surface of the vehicle tire just above the vehicle tire ("horizontal" chain links), while the chain links arranged between the horizontal chain links are away from the surface of the vehicle tire ("vertical" chain links).

In FIG. 5, all the chain links shown are those according to the present invention, i.e., with a round outer profile and an angular inner profile. The vertical chain links 110, 111 also have a part subject to wear 107, as it is described in FIGS. 3, 4a and 4b.

In FIG. 5, two vertical chain links 110, 111 are connected to a horizontal chain link 112, which does not have a part subject to wear 107. Due to the special design of the chain links, especially due to the angular design of the inner cross-sectional area, this connection is very torsion-proof, while at the same time the surface of the vehicle tire is protected by the round design of the outer sides. To further improve the grip between vehicle tire and roadway, an additional transverse chain link 113, which is pushed over the horizontal chain link 112, is arranged between the vertical chain links 110, 111. For manufacturing engineering reasons, the transverse chain link 113 is "bent upwards" onto the horizontal chain link 112 and fixed in that the part subject to wear 107 is welded on. Therefore, the transverse chain link 113 has a gap (or a weld seam) 116 on its upper side wall.

FIG. 6a, which shows a view of the anti-skid chain 109 in the direction of its central plane E (or the central plane E of the vertical chain links 110, 111), shows the contacting of the roadway by the parts subject to wear 107 for improving traction. Thanks to the special profile of the chain links 110, 111, 112, 113, the anti-skid chain 109 (or the chain links in relation to one another) can be moved essentially only in the central plane E' of the horizontal chain link 112—under a load, therefore, a continuous contacting of the roadway by the parts subject to wear is made possible, because the chain links cannot, or can barely, be rotated in relation to one another.

FIG. 6b shows a top view of the anti-skid chain 109 in the direction of the central plane of the horizontal chain link. The rectangular shape of the parts subject to wear 107 can be easily seen here. Of course, the parts subject to wear 107 may also have a different shape, for example, they may have a polygon-shaped, round or even oval design. Furthermore, it is possible, instead of the rectangular parts subject to wear shown, to provide a plurality of individual pins.

While the principles of the invention have been described above in connection with preferred embodiments, it is to be clearly understood that this description is made only by way of example and not as a limitation of the scope of the invention.

What is claimed is:

1. A chain link for an anti-skid chain, the chain link having an essentially oval shape, the chain link comprising:
   an upper side wall, a lower side wall, and a longitudinal central axis that bisects the chain link into upper and lower halves, wherein the upper side wall, the lower side wall, and the longitudinal central axis lie in a central plane of the chain link, the central plane bisecting the chain link into a left half and a right half, the left half lying on a left side of the central plane and the right half lying on a right side of the central plane,
   wherein the chain link has a cross section with an inner cross-sectional area proximal to the longitudinal central axis and an outer cross-sectional area distal to the longitudinal central axis, the outer cross-sectional area having an outer surface having an approximately arcuate shape, the inner cross-sectional area comprising a flat side extending on both of the left side and the right side of the central plane, the flat side being oriented essentially perpendicular to the central plane of the chain link, the inner cross-sectional area further comprising, on each of the left side and the right side of the central plane, a first edge that defines a boundary between the outer cross-sectional area and the inner cross-sectional area, a second edge that defines a boundary of the flat side, and a chamfered area located between the first edge and the second edge,
   wherein the chamfered area is oriented at an angle to the central plane, the angle having a value less than 90°.

2. The chain link in accordance with claim 1, the chain link further comprising at least one part subject to wear, characterized in that the at least one part subject to wear is arranged on the upper side wall of the chain link.

3. The chain link in accordance with claim 2, characterized in that the at least one part subject to wear has a first portion that faces towards the upper side wall and a second portion that faces away from the upper side wall, wherein a cross-sectional area of the first portion has an outer surface having an approximately arcuate shape and the second portion has a flat side, the flat side being oriented essentially perpendicular to the central plane of the chain link.

4. The chain link in accordance with claim 2, characterized in that the at least one part subject to wear is designed in the form of a pin.

5. The chain link in accordance with claim 2, characterized in that the at least one part subject to wear further comprises an axis of symmetry, and the axis of symmetry is not parallel with the central plane of the chain link.

6. An anti-skid chain for mounting on a vehicle tire having a running surface, the anti-skid chain having a chain mesh having chain element configurations, the chain element configurations consisting alternately of vertical chain links that are oriented approximately perpendicular to the running surface when the anti-skid chain is mounted on the vehicle tire and horizontal chain links that are oriented parallel to the running surface when the anti-skid chain is mounted on the vehicle tire, characterized in that the vertical chain links are the chain links in accordance with claim 1.

7. The anti-skid chain in accordance with claim 6, characterized in that at least one of the vertical chain links has at least one part subject to wear.

8. The anti-skid chain in accordance with claim 6, further comprising a transverse chain link arranged between first and second vertical chain links of the chain element configurations and around a horizontal chain link of the chain element configurations, the horizontal chain link joining the first and second vertical chain links together, the transverse chain link having a central plane, the central plane of the transverse chain link being oriented perpendicular to a central plane of the first vertical chain link and perpendicular to a central plane of the second vertical chain link.

9. The anti-skid chain in accordance with claim 8, characterized in that at least one part subject to wear is arranged on an upper side wall of the transverse chain link.

* * * * *